P. R. HEER.
CLAMP FOR SURVEYING INSTRUMENTS.
APPLICATION FILED DEC. 11, 1909.
964,776.
Patented July 19, 1910.
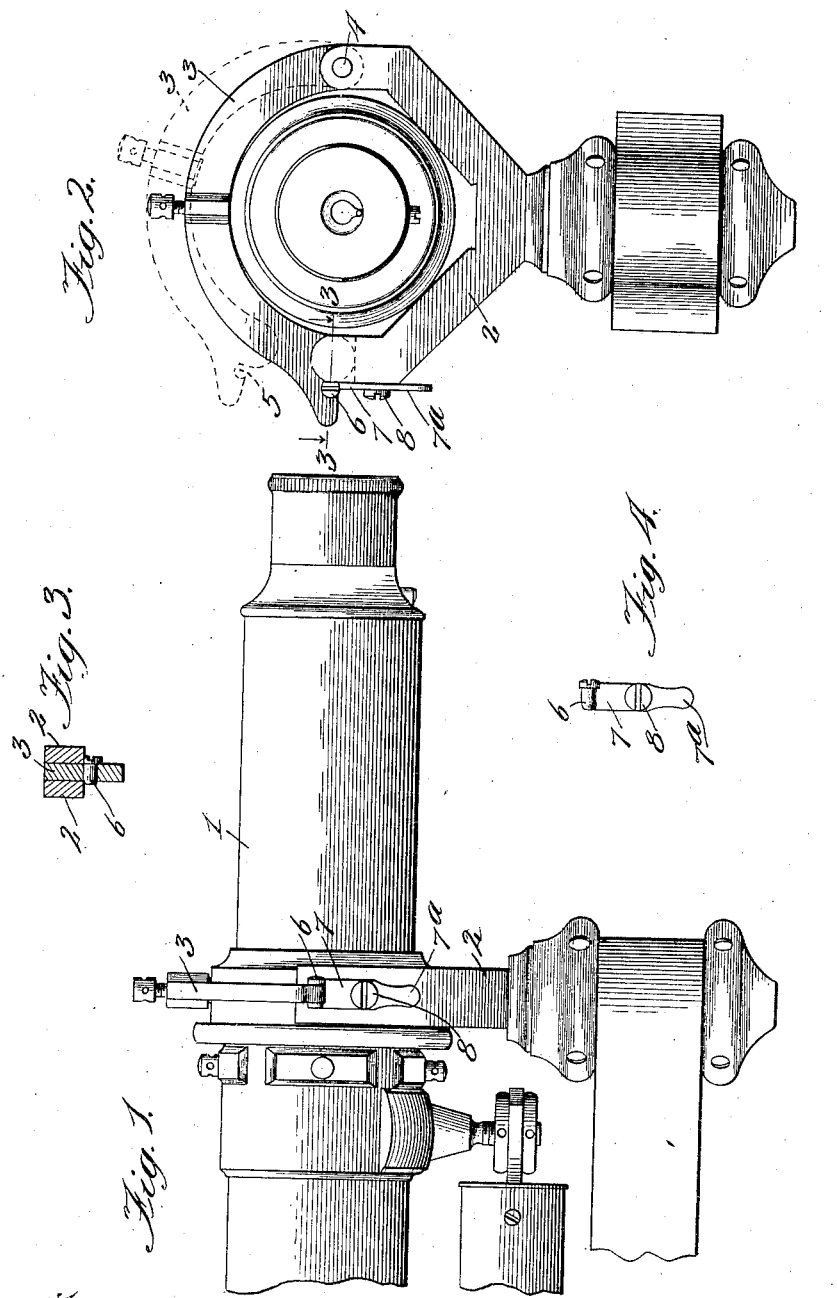
Witnesses:
Inventor:
PETER R. HEER
By Cheever & Cox
Att'ys

UNITED STATES PATENT OFFICE.

PETER R. HEER, OF CHICAGO, ILLINOIS, ASSIGNOR TO EUGENE DIETZGEN COMPANY FACTORY, OF CHICAGO, ILLINOIS, A CORPORATION OF ILLINOIS.

CLAMP FOR SURVEYING INSTRUMENTS.

964,776.  Specification of Letters Patent.  Patented July 19, 1910.

Application filed December 11, 1909. Serial No. 532,572.

*To all whom it may concern:*

Be it known that I, PETER R. HEER, a citizen of the United States, residing at Chicago, in the county of Cook and State of Illinois, have invented a certain new and useful Improvement in Clamps for Surveying Instruments, of which the following is a specification.

My invention relates to clamps for surveying instruments such as wye levels and transits, and the object of the invention is to provide means for readily locking and unlocking the clamp and also to provide a locking device which will be safe and permanent. I obtain my objects by the mechanism illustrated in the accompanying drawings, in which—

Figure 1 is a side elevation showing a portion of the telescope in position. Fig. 2 is an end elevation looking toward the left in Fig. 1. Fig. 3 is a detail plan section taken on the line 3—3, Fig. 2, and Fig. 4 is a face view of the locking arm.

Similar reference characters denote similar parts in the several views.

The telescope 1 is supported near its two ends in Y shaped supports 2 forming part of the frame of the instrument, as in the well known construction. A clip 3 is hinged to one branch of the said support by the pin 4, as in the ordinary construction.

At its free end the clip has an eye 5 adapted to receive a pin 6 formed at the end of a locking arm 7, which is mounted so as to turn upon a pivot 8 secured to the other branch of the Y shaped support. The locking arm in the present instance is so mounted as to swing in a plane transverse to the plane of the clip, and by preference, is pivoted near the middle so that the lower portion 7ª may be used as a handle whereby the arm may be manipulated. The pin 6 may be curved to conform to the arc of the circle having a pivotal point of the arm as a center and it is desirable also that the forward extremity of the pin be tapered or beveled so that it may more readily find the eye 5. By preference a head is formed on the rear of the pin to prevent it from going too far.

In operation, when the telescope is to be locked in position it is first adjusted to place in the Y shaped supports 2, after which the clip 3 is lowered to the position shown in full lines in Figs. 1 and 2. The locking arm 7 is then swung so as to bring the pin 6 into the eye 5 which will securely hold the clip in closed position. As the front end of the pin is tapered it will find the eye of the clip even though the clip may not be lowered to the exact position required. As the pin conforms to the arc of a circle it may be pushed home without difficulty. This construction affords all of the simplicity, security and tightness of the ordinary loose locking pin or bolt and at the same time has the advantage of being more readily manipulated and of avoiding the liability of being lost.

Having thus described my invention what I claim as new and desire to secure by Letters Patent is:—

The combination with a telescope of a surveyor's instrument, of a support for holding the same, a clip articulately connected to one of the branches of said support, said clip having an eye formed therein near its free end a locking arm pivoted at its center to the other branch of said support and adapted to swing in a plane transverse to the path of movement of the clip, and an arcuate shaped pin carried at one end of said locking arm and adapted to enter the eye in the clip for holding the latter in closed position, said pin being tapered at its forward extremity to facilitate its finding the eye in the clip and having a head at the other end to prevent it from going too far, the remaining end of said arm being considerably protruded away from the frame to provide a hand hold.

In witness whereof, I have hereunto subscribed my name in the presence of two witnesses.

PETER R. HEER.

Witnesses:
MARGARET D. ROBB,
MAX S. ROSENZWEIG.